United States Patent
Hur et al.

(10) Patent No.: US 9,241,212 B2
(45) Date of Patent: Jan. 19, 2016

(54) RAY TRACING APPARATUS AND METHOD

(75) Inventors: Jin Suk Hur, Seoul (KR); Woo Chan Park, Seoul (KR)

(73) Assignees: SILICONARTS, INC., Seoul (KR); Industry-Academia Cooperation Foundation of Sejong University, Seoul (KR)

(*) Notice: Subject to any disclaimer, the term of this patent is extended or adjusted under 35 U.S.C. 154(b) by 312 days.

(21) Appl. No.: 13/375,123

(22) PCT Filed: May 19, 2010

(86) PCT No.: PCT/KR2010/003172
§ 371 (c)(1),
(2), (4) Date: Nov. 29, 2011

(87) PCT Pub. No.: WO2010/137821
PCT Pub. Date: Dec. 2, 2010

(65) Prior Publication Data
US 2012/0075300 A1    Mar. 29, 2012

(30) Foreign Application Priority Data
May 29, 2009  (KR) .......................... 10-2009-0047547

(51) Int. Cl.
*H04R 3/00*      (2006.01)
*H04M 1/60*    (2006.01)
*H04R 1/00*     (2006.01)
*H04R 1/10*     (2006.01)

(52) U.S. Cl.
CPC .............. *H04R 3/00* (2013.01); *H04M 1/6058* (2013.01); *H04R 1/1016* (2013.01); *H04R 2420/05* (2013.01)

(58) Field of Classification Search
CPC ... G06T 15/00; G06T 2210/36; G06T 15/005; G06T 7/20; G06T 13/20; G06T 15/06; G06T 2210/12; G06T 17/005; G06T 2207/20016; G06T 19/00; G09G 5/363
See application file for complete search history.

(56) References Cited

U.S. PATENT DOCUMENTS

| | | | |
|---|---|---|---|
| 8,358,876 B1 * | 1/2013 | Gilra et al. | 382/298 |
| 2006/0290696 A1 * | 12/2006 | Munshi et al. | 345/428 |
| 2008/0074416 A1 * | 3/2008 | Brown et al. | 345/420 |
| 2008/0259075 A1 * | 10/2008 | Fowler et al. | 345/421 |
| 2009/0167763 A1 * | 7/2009 | Waechter et al. | 345/426 |

OTHER PUBLICATIONS

Ingo Wald Carsten Benthin Philipp Slusallek; "Distributed Interactive Ray Tracing of Dynamic Scenes"; Oct. 2003; IEEE; Proceedings of the IEEE Symposium on Parallel and Large-Data Visualization and Graphics; 77-85.*
Wald et al., State of the Art in Ray Tracing Animated Scenes, Eurographics 2007.*

* cited by examiner

*Primary Examiner* — Haixia Du
(74) *Attorney, Agent, or Firm* — Paratus Law Group, PLLC

(57) ABSTRACT

The ray tracing apparatus for three-dimensional (3D) graphics includes a Central Processing Unit (CPU) for constructing a first Acceleration Structure (AS) for a static object, and creating a second dynamic object by performing a Level Of Detail (LOD) operation on the first dynamic object and a ray tracing core for performing ray tracing based on the first AS and a second AS for the second dynamic object. The CPU or the ray tracing core constructs the second AS for the second dynamic object.

12 Claims, 5 Drawing Sheets

RAY TRACING APPARATUS AND METHOD

CROSS-REFERENCE TO RELATED APPLICATIONS

This application is the United States National Phase under 35 U.S.C. §371 of PCT International Patent Application No. PCT/KR2010/003172, which designated the United States of America, having an International Filing date of May 19, 2010, and claiming priority to Korean Application No. 10-2009-0047547, filed May 29, 2009.

FIELD OF THE INVENTION

The described technology relates generally to three-dimensional (3D) graphic processing and, more particularly, to a ray tracing apparatus and method.

BACKGROUND OF THE INVENTION

A 3D graphic technology uses 3D geometric data representation in a computing system and is adopted in various industries such as media and game industries. Generally, the 3D graphic technology requires a separate high performance processor due to a large amount of computations.

Particularly, according to a recent development of processor, a ray tracing technology has developed very realistic 3D graphic techniques and can simulate light effects such as reflection, refraction and shading.

SUMMARY OF THE INVENTION

In some embodiments, a ray tracing apparatus for three-dimensional (3D) graphics includes a Central Processing Unit (CPU) for constructing a first Acceleration Structure (AS) for a static object, and creating a second dynamic object by performing a Level Of Detail (LOD) operation on the first dynamic object and a ray tracing core for performing ray tracing based on the first AS and a second AS for the second dynamic object. The CPU or the ray tracing core constructs the second AS for the second dynamic object.

In some embodiments, a ray tracing apparatus for 3D graphics includes memory for storing a first AS for a static object and a second AS for a second dynamic object (the second dynamic object is created by performing a Level Of Detail (LOD) operation on the first dynamic object) and a ray tracing core for performing ray tracing based on the first and second ASs.

In some embodiments, a ray tracing method for 3D graphics includes constructing a first AS for a static object, creating a second dynamic object by performing an LOD operation on the first dynamic object, constructing a second AS for the second dynamic object and performing ray tracing based on the first AS and the second AS for the second dynamic object.

Figure 1:
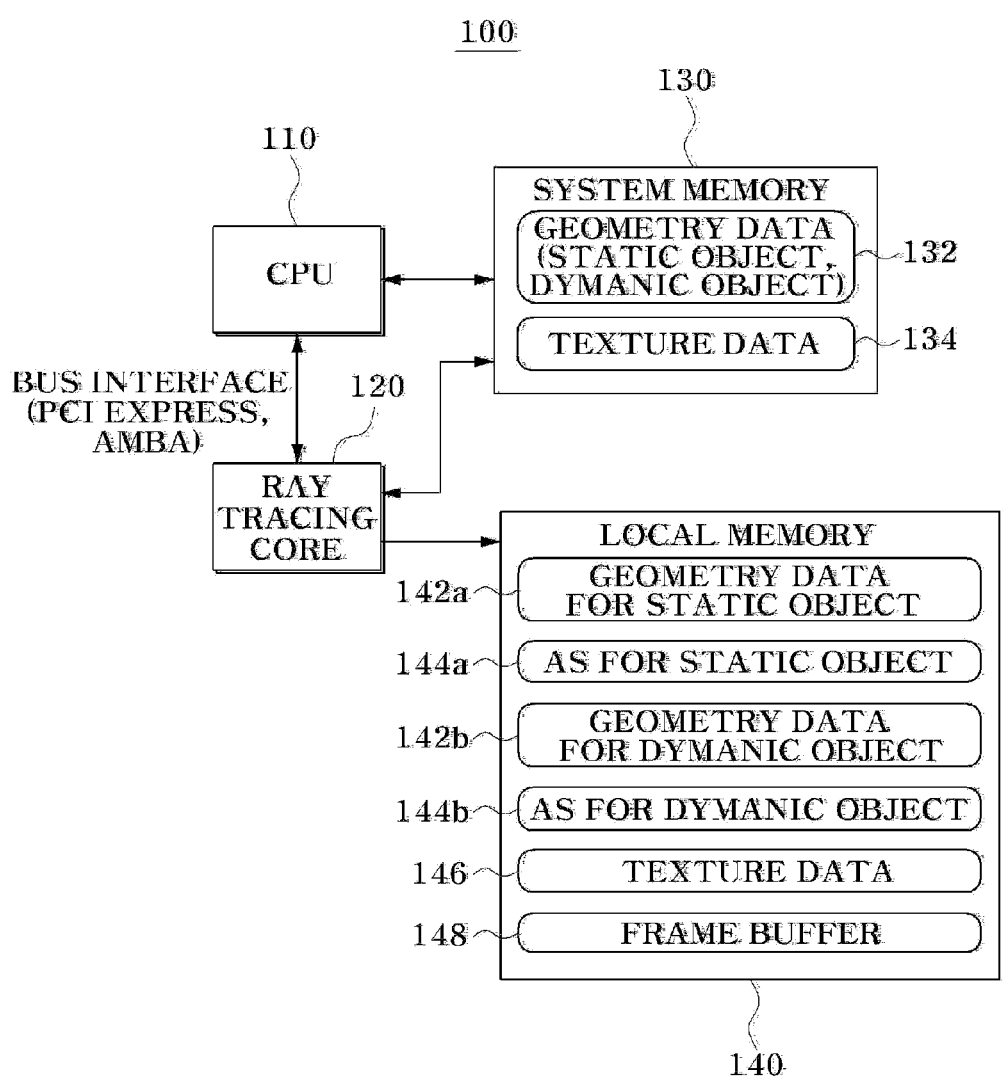
FIG. 1 is a block diagram illustrating a ray tracing apparatus according to an example embodiment of the described technology.

It should be understood that the drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the described technology now will be described more fully with reference to the accompanying drawings, in which embodiments of this technology are shown. This technology may, however, be embodied in many different forms and should not be construed as limited to the embodiments set forth herein. Rather, these embodiments are provided so that this disclosure will be thorough and complete, and will fully convey the scope of this technology to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, this technology will be described in detail with reference to the accompanying drawings.

Figure 2:
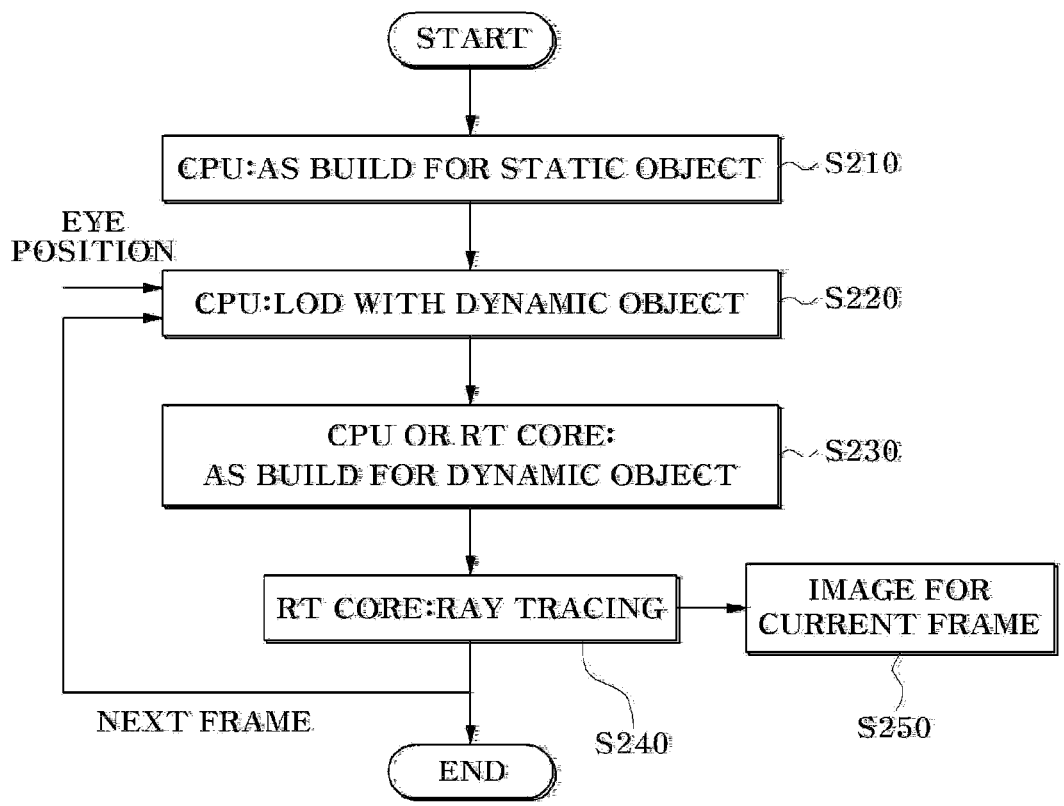
FIG. 2 is a flowchart illustrating the operating procedure of the ray tracing apparatus of FIG. 1.

FIG. 1 is a block diagram illustrating a ray tracing apparatus 100 according to an example embodiment of the described technology, and FIG. 2 is a flowchart illustrating the operating procedure of the ray tracing apparatus 100 of FIG. 1.

Referring to FIG. 1, the ray tracing apparatus 100 includes a Central Processing Unit (CPU) 110, a ray tracing core 120, system memory 130, and local memory 140.

Figure 5:
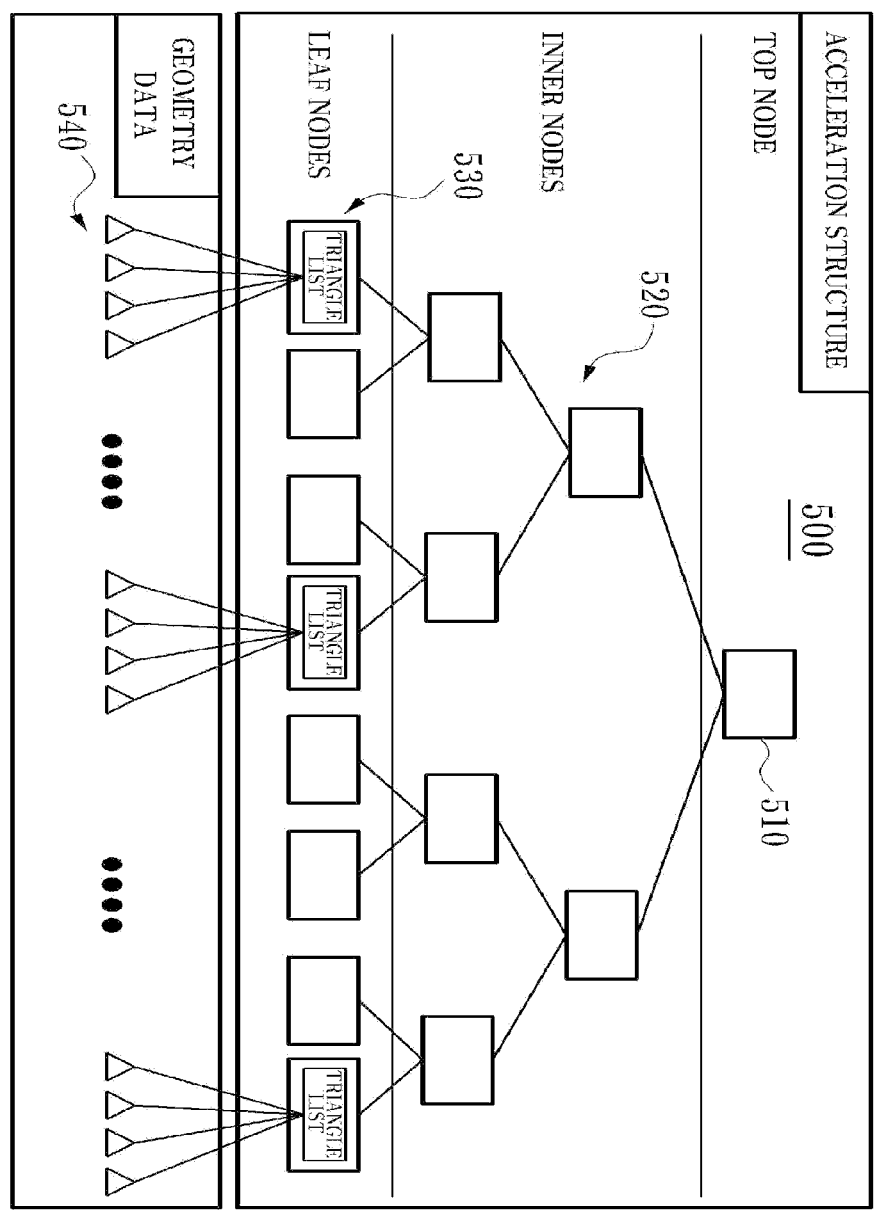
FIG. 5 is a diagram illustrating an AS and geometry data.

The CPU 110 constructs a first Acceleration Structure (AS) for a static object (step S210). FIG. 5 is a diagram illustrating an AS and geometry data. An AS includes a k-depth tree (kd-tree) or a Bounding Volume Hierarchy (BVH) which is generally used in ray tracing. FIG. 5 assumes that the AS corresponds to a kd-tree.

Objects are classified into static objects which do not actively move and into dynamic objects which actively move. For example, in a three-dimensional (3D) game, static objects may include background scenes, and dynamic objects may include characters. A method of constructing an AS by integrating all of the above-described items is disclosed in Ingo Wald, William R Mark, Johannes Gunther, Solomon Boulos, Thiago Ize, Warren Hunt, Steven G Parker, and Peter Shirley, "State of the Art in Ray Tracing Animated Scenes," Eurographics 2007 State of the Art Reports.

An object includes geometry data, and geometry data includes triangle information which constitutes a space. In an embodiment, triangle information may include the texture coordinates of the three points of each triangle and a normal vector. In an embodiment, in the case of a static object, geometry data may change only rarely after being constructed, and in the case of a dynamic object, geometry data may be frequently constructed.

A kd-tree 500 is a kind of tree spatial partitioning tree, and is used for a ray-triangle intersection test. The kd-tree 500 includes a box node 510, inner nodes 520, and leaf nodes 530. Each of the leaf nodes 530 includes a triangle list which is used to point to at least one piece of triangle information included in geometry data. In an embodiment, if triangle information included in geometry data is implemented in the form of an arrangement, a triangle list included in each of the leaf nodes 530 may correspond to an arrangement index.

Furthermore, the CPU 110 creates a second dynamic object by performing a Level Of Detail (LOD) operation on the first dynamic object dynamic object (step S220). Accounting for LOD involves decreasing the complexity of a 3D object representation as it moves away from the viewer or according to other metrics such as object importance, eye-space speed or position.

In an embodiment, when a first dynamic object moves away from a viewer, the CPU 110 may create a coarse representation of a second dynamic object. In another embodiment, when a first dynamic object moves close from a viewer, the CPU 11 may create a refined representation of a second dynamic object.

The CPU 110 or ray tracing core 120 constructs the second AS for the second dynamic object (step S230). Since the process of constructing the second AS is substantially the same as that for the first AS, a description thereof will be omitted here.

The ray tracing core 120 performs ray tracing based on the first AS and the second AS for the second dynamic object (step S240), and finally creates an image for a current frame (step S250). If the dynamic object varies, steps S220 to S250 are performed.

The operation of the ray tracing core 120 will now be described.

Figure 3:
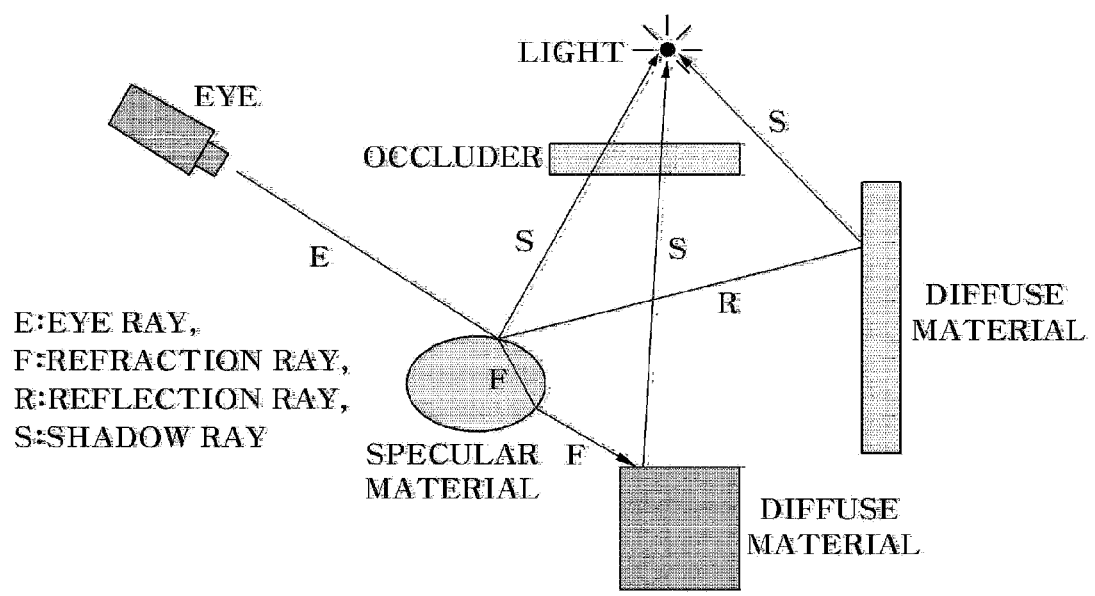
FIGS. 3 and 4 are drawings illustrating a ray tracing process.
Figure 4:
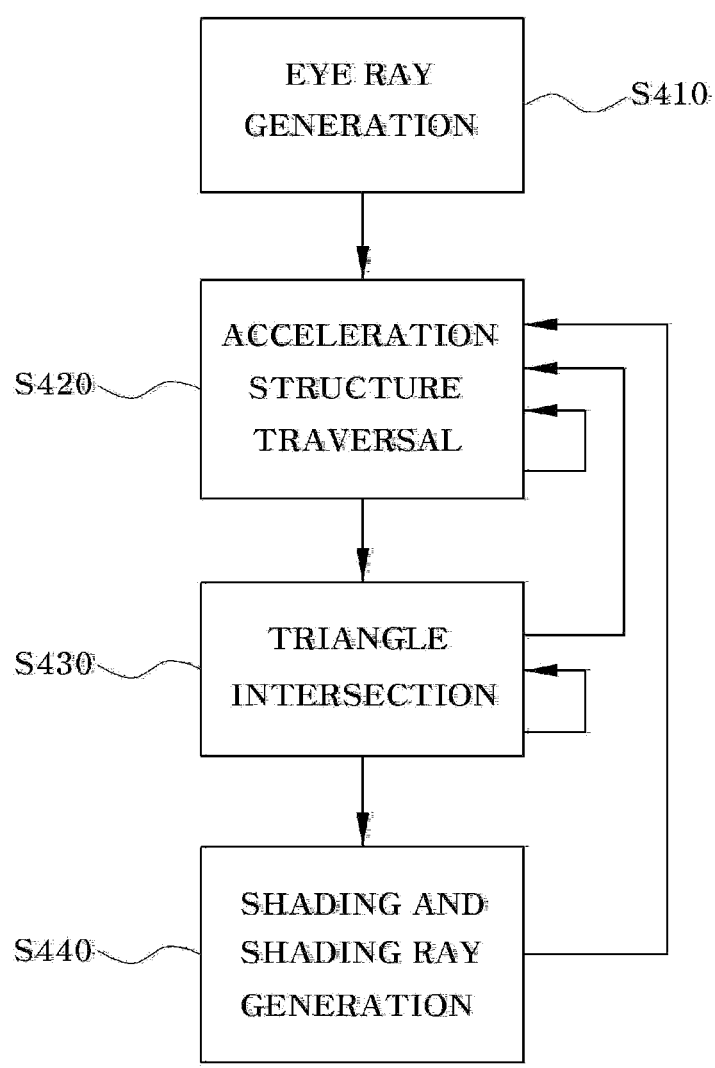

FIGS. 3 and 4 are drawings illustrating a ray tracing process.

Ray tracing is recursively performed by the ray tracing core 120, and includes (i) an eye ray creation process (step S410), (ii) an AS Traversal process (step S420), (iii) a ray-triangle intersection test process (step S430), and (iv) a shading and shading ray creation process (step S440). Here, a shading ray includes a shadow ray S, a refraction ray F, and/or a reflection ray R.

The ray tracing core 120 performs a ray-triangle intersection test on each of the first and second ASs. The reason for this is that an image for a current frame may include both a static object and a dynamic object.

The ray tracing core 120 performs ray tracing based on an AS having a triangle which is intersected by a ray in the first or second AS. That is, if there exists a triangle which is intersected by a ray in the first or second AS, the ray tracing core 120 performs ray tracing on an AS where the triangle exists. For example, if a triangle which is intersected by a ray exists in the first AS, ray tracing may be performed on the first AS.

If the first and second ASs each have a triangle which is intersected by a ray, the ray tracing core 120 selects an AS for ray tracing based on the distances between the starting point of the ray and the intersected triangles. In an embodiment, the ray tracing core 120 may select a triangle having the shorter one of the distances between the starting point of the ray and the intersected triangles. The reason for this is that the triangle having a shorter distance can correspond to an object which is closer to a viewer.

It is assumed that the distance between an eye starting point and the intersected triangle of the first AS corresponds to S1 and the distance between the eye starting point and the intersected triangle of the second AS corresponds to S2. If S1 is shorter than S2, the ray tracing core 120 performs ray tracing based on the intersected triangle of the first AS. If S2 is shorter than S1, the ray tracing core 120 performs ray tracing based on the intersected triangle of the second AS.

Referring back to FIG. 1 again, the system memory 130 and the local memory 140 included in the ray tracing apparatus are separated from each other so as to provide logical demarcation. If necessary, the system memory 130 and the local memory 140 may be integrated into single piece of memory.

The system memory 130 may be accessed by the CPU 110 or ray tracing core 120. The system memory 130 stores geometry data 132 including triangle information and texture data 134 provided for texture. The local memory may be accessed by the ray tracing core 120. The local memory includes geometry data 142a and 142b provided for static and second dynamic objects, ASs 144a and 144b provided for static and second dynamic objects, texture data 146 required by the texture data stored in the system memory 130, and a frame buffer 148 provided for a current frame.

The described technology has the following advantages. However, since it does not mean that a specific embodiment should have all the advantages or should have only the advantages, it should not be understood that the range of the rights of the disclosed technology are limited by the advantages.

The ray tracing apparatus according to an example embodiment may perform an LOD operation on a dynamic object so as to efficiently process ray tracing. Accordingly, the ray tracing apparatus can efficiently perform ray tracing while taking into consideration the distance to a viewer.

The ray tracing apparatus according to an example embodiment may perform ray tracing using respective, different ASs for static and dynamic objects. Accordingly, the ray tracing apparatus can construct ASs at high speed, with the result that ray tracing can be performed efficiently.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A ray tracing apparatus for three-dimensional (3D) graphics, comprising:
a Central Processing Unit (CPU) configured to construct a first Acceleration Structure for a static object, and to perform a Level of Detail (LOD) operation on a first dynamic object to create a second dynamic object, wherein the LOD operation is not configured to perform on the static object and the LOD operation is operated based on a distance between the first dynamic object and a viewer, wherein, in the LOD operation,
when the first dynamic object moves away from the viewer, the CPU creates a coarse representation of the second dynamic object, and
when the first dynamic object moves close to the viewer, the CPU creates a refined representation of the second dynamic object; and
a ray tracing core being connected with the CPU through a bus interface and the ray tracing core being configured to construct a second Acceleration Structure for the second dynamic object created by the LOD operation, and to respectively perform ray tracing based on the first Acceleration Structure and the second Acceleration Structure for the second dynamic object to create an image for a current frame.

2. The ray tracing apparatus of claim 1, wherein the ray tracing core performs a ray-triangle intersection test on each of the first and second Acceleration Structures.

3. The ray tracing apparatus of claim 2, wherein the ray tracing core performs the ray tracing based on an Acceleration Structure which is selected from the first and second Acceleration Structures having a triangle which is intersected by a ray.

4. The ray tracing apparatus of claim 2, wherein the ray tracing core selects an Acceleration Structure, based on which the ray tracing is performed, based on distances between a starting point of a ray and intersected triangles, when the each of the first and second Acceleration Structures has an intersected triangle which is intersected by the ray.

5. The ray tracing apparatus of claim 4, wherein the ray tracing core selects a triangle having a shorter one of the distances between the starting point of the ray and the intersected triangles.

6. A ray tracing apparatus for 3D graphics, comprising:
memory for storing a first Acceleration Structure for a static object and a second Acceleration Structures for a second dynamic object, wherein the second dynamic object is created by performing a Level Of Detail (LOD) operation on a first dynamic object,
wherein the LOD operation is only configured by a Central Processing Unit (CPU) and is not configured to perform on the static object, wherein, in the LOD operation,
when the first dynamic object moves away from a viewer, the CPU creates a coarse representation of the second dynamic object, and
when the first dynamic object moves close to the viewer, the CPU creates a refined representation of the second dynamic object; and
a ray tracing core for respectively performing ray tracing based on the first and second Acceleration Structures for the second dynamic object to finally create an image for a current frame.

7. The ray tracing apparatus of claim 6, wherein the ray tracing core constructs the second Acceleration Structure for the second dynamic object prior to the ray tracing.

8. The ray tracing apparatus of claim 6, wherein the ray tracing core performs a ray-triangle intersection test on each of the first and second Acceleration Structures.

9. The ray tracing apparatus of claim 8, wherein the ray tracing core performs the ray tracing based on an Acceleration Structure, which is selected from among the first and second Acceleration Structures, and which has a triangle which is intersected by a ray.

10. The ray tracing apparatus of claim 8, wherein the ray tracing core selects an Acceleration Structure, based on which the ray tracing is performed, based on distances between a starting point of a ray and intersected triangles, when the each of the first and second Acceleration Structures has an intersected triangle which is intersected by the ray.

11. The ray tracing apparatus of claim 10, wherein the ray tracing core selects a triangle having a shorter one of the distances between the starting point of the ray and the intersected triangles.

12. A ray tracing method for 3D graphics, comprising:
constructing, using a Central Processing Unit (CPU), a first Acceleration Structure for a static object,
performing, using the CPU, a Level Of Detail (LOD) operation on a first dynamic object to create a second dynamic object, wherein the LOD operation does not perform on the static object, wherein, in the LOD operation,
when the first dynamic object moves away from a viewer, a coarse representation of the second dynamic object is created by the CPU, and
when the first dynamic object moves close to the viewer, a refined representation of the second dynamic object is created by the CPU; and
constructing, using a ray tracing core being connected with the CPU through a bus interface, a second Acceleration Structure for the second dynamic object created by the LOD operation,
respectively performing, using the ray tracing core, ray tracing based on the first Acceleration Structure and the second Acceleration Structure for the second dynamic object to create an image for a current frame.

* * * * *